Patented Nov. 5, 1946

2,410,796

UNITED STATES PATENT OFFICE 2,410,796

SOLUBLE AMIDINE SALTS

George Newbery, Brentwood, and Alexander Peter Tawse Easson, Hornchurch, England, assignors to May & Baker Limited, Dagenham, Essex, England, a British company No Drawing. Original application April 11, 1942, Serial No. 438,612. Divided and this application May 11, 1945, Serial No. 593,326. In Canada April 7, 1942

5 Claims. (Cl. 260—501)

This application is a division of application Serial No. 438,612, filed April 11, 1942.

This invention relates to new salts of certain therapeutically-active amidine derivatives and it has for its principal object the provision of a new class of therapeutically active compounds that can be administered in the form of an aqueous solution. A further object is to provide processes for the production of such compounds.

It has already been shown that valuable therapeutic properties are possessed by the symmetrical aromatic diamidines possessing the general formula Am. R. X. R. Am, in which Am represents an amidine group

R represents a benzene radical, and X represents a linkage which may be a single bond or an alkane chain $—(CH_2)_n$ (where $n$ represents 1 to 10 and in which also one or more of the $CH_2$ groups may be replaced by oxygen, sulphur or the group NH) or X represents a $—CR_1=CR_2—$ grouping in which $R_1$ and $R_2$ each represent either a hydrogen atom or a hydrocarbon group (e. g. an alkyl, aryl or aralkyl group). Generally, the salts of these diamidines, such as the hydrochlorides, are not very readily soluble in water. It is an obvious therapeutic advantage to have available stable salts possessing a high degree of solubility in water and the present invention has for its object the production of such salts. In many instances, therapeutically useful basic compounds have been found to furnish extremely soluble salts with methane-sulphonates, but in the case of the various therapeutically useful amidine compounds, such as 4:4'-diamidino-stilbene or 4:4'-diamidino-diphenoxypentane, the dimethane-sulphonates are very little more soluble than the hydro chlorides.

We have discovered a new class of salts of the symmetrical aromatic diamidines having the foregoing general formula, which salts are stable and possess a high degree of solubility in water, such salts being the salts with members of the group consisting of hydroxy-ethane sulphonic acid and hydroxy-propane sulphonic acid.

In general, these new salts can be prepared by combining the diamidine base or a salt thereof with hydroxy ethane sulphonic acid or hydroxy-propane sulphonic acid or with a salt of either of such acids. Specifically, the diamidine base can be directly combined with hydroxy-ethane or hydroxy-propane sulphonic acid or with a suitable salt of either of such acids (e. g. the ammonium salt). Alternatively, the required salts may be formed by producing the diamidine base in situ and in the presence of either one of the said acids or a salt of such acid. Thus, the imino-ether corresponding to the diamidine base may be reacted with the ammonium salt of hydroxy-ethane or hydroxy-propane sulphonic acid. Again, the required salts may be obtained by double decomposition of suitable salt pairs e. g. using the dihydrochloride of the diamidine base and the silver salt of the acid.

Examples of diamidines of the foregoing general formula are: 4:4'-diamidino-diphenoxy pentane, 4:4'-diamidino-diphenoxy propane and 4:4'-diamidino-diphenylether, 4:4'-diamidino-stilbene and 4:4'-diamidino-$\alpha,\alpha'$-dimethyl-stilbene.

In the following description, there are given, purely by way of illustration, examples of the manufacture of compounds within the scope of the present invention.

Example I

4:4'-diamidino-stilbene (7.2 g.) was added to 6.8 cc. of 8N aqueous solution of $\beta$-hydroxy-ethane-sulphonic acid, the mixture warmed to about 40° C. and just sufficient water added to complete solution. Acetone was then slowly added, when 4:4'-diamidino-stilbene di-$\beta$-hydroxyethane sulphonate (di-isethionate) crystallised in the form of prisms (solubility in water approx. 1 in 3 at 20° C.)

The corresponding di-$\gamma$-hydroxy-propane-sulphonate is similarly prepared (using the theoretical amount of $\gamma$-hydroxy-propane-sulphonic acid) and crystallises in prisms (solubility in water approx. 1 in 4 at 20° C.)

Example II

4:4'-diamidinodiphenoxy-pentane-di-hydroxy-ethane-sulphonate prepared by the method of Example I, using the theoretical amounts of the diamidine and the acid, crystallised as prisms on addition of acetone to the aqueous solution. It contains 2½ $H_2O$ and is soluble in water, approx. 1 in 8 at 20° C.

Example III 3.2 grms. of 4:4'-diamidinodiphenoxy propane were dissolved in a slight excess of 4N isethionic acid. The solution was just acid to litmus. It was filtered with charcoal, the solids washed with a little methanol and the amidine isethionate precipitated from the filtrate and washings by adding acetone. The yield of the required 4:4'-diamidinodiphenoxy propane di-isethionate was 5.2 grms.

Example IV 67.2 grms. of 4:4'-diamidinodiphenylether were dissolved in a slight excess of 8N isethionic acid with sufficient water to give complete solution in the cold. The solution was just acid to litmus, and to it was added about quarter of its volume of alcohol. Acetone was then added slowly and with stirring, so that the amidine isethionate separated in crystalline form. Addition was continued until precipitation was almost complete. The mixture was allowed to stand for some time and the crystals filtered off, washed with acetone and dried. The yield of the required 4:4'-diamidinodiphenylether di-isethionate was 130 grms.

Example V 9.0 grms. of 4:4'-diamidino-$\alpha,\alpha'$-dimethylstilbene dihydrochloride were dissolved in a little warm water and slight excess of caustic soda solution added. The diamidine base was precipitated as an oil which solidified on cooling in ice. The base was filtered off, washed with water and then while damp dissolved in a slight excess of 8N isethionic acid. A little alcohol was added and the required 4:4'-diamidino-$\alpha,\alpha'$-dimethyl-stilbene di-isethionate precipitated in the form of buff yellow micro crystals. Yield 9.8 grms.

Example VI 26 grms. of 4:4'-diamidino stilbene were added in small portions to a gently boiling mixture of 28 grms. (2 mols.) of ammonium isethionate and 250 ccs. of 50% alcohol. Ammonia was immediately evolved with the formation of the amidine base which dissolved completely in a few minutes. The reaction was completed by boiling off the ammonia, whereafter the solution was filtered with charcoal. The required 4:4'-diamidinostilbene di-isethionate was precipitated by slowly adding acetone. Yield about 90%.

Example VII

A mixture of stilbene 4:4'-di-iminoethyl-ether (1.6 g.) and finely powdered ammonium $\beta$-hydroxy-ethane-sulphonate was suspended in 5 cc. of absolute alcohol to which was added a few drops of concentrated alcoholic ammonia and the mixture brought to the boil. Most of the ammonium salt dissolved and separation of the amidine isethionate followed in a few minutes. The temperature was maintained at 40° C. for approx. 20 hours with occasional shaking, acetone was then added and the precipitated solid filtered off and dissolved in a little water. The somewhat turbid solution was charcoaled, filtered and again treated with acetone. The required 4:4'-diamidino-stilbene-di-$\beta$-hydroxy-ethane-sulphonate crystallised out as in Example I.

Example VIII 37.3 grms. of pure 4:4'-diamidinostilbene dihydrochloride dihydrate (33.7 grms. of anhydrous salt) were dissolved in 400 ccs. of hot water and a solution of 46.8 grms. of silver isethionate in 100 ccs. of water was added with stirring. The mixture was heated on the steam bath for some time to coagulate the silver chloride which precipitated. The precipitate was filtered off (charcoal can be used if necessary to clarify), and the solids washed with water. The filtrate and washings were concentrated by evaporation and the required diamidine di-isethionate precipitated in crystalline form by adding a little alcohol, followed by the slow addition of acetone with shaking, until precipitation was complete. The yield obtained was 49 grms. of 95% of theory.

We claim:

1. 4:4'-diamidino-diphenylether-di-beta-hydroxyethane-sulphonate.

2. Process for the production of a symmetrical aromatic diamidine salt having the formula

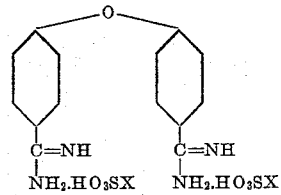

in which X is selected from the group consisting of hydroxy-ethyl and hydroxy-propyl radicals, which comprises reacting a compound of the formula

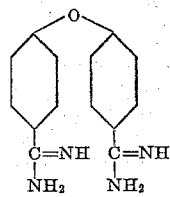

with a member selected from the group consisting of beta-hydroxyethane-sulphonic acid, gamma-hydroxy-propane-sulphonic acid, and the ammonium salt of a said acid.

3. A symmetrical compound of the formula

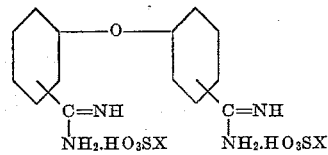

in which X is selected from the group consisting of hydroxy-ethyl and hydroxy-propyl radicals.

4. Process for the production of 4:4'-diamidino-diphenylether-di-beta-hydroxy-ethane-sulphonate, which comprises reacting 4:4'-diamidino-diphenylether with beta-hydroxy-ethane-sulphonic acid.

5. Process for the production of a symmetrical aromatic diamidine salt having the formula

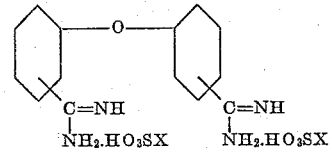

in which X is selected from the group consisting of hydroxy-ethyl and hydroxy-propyl radicals, which comprises reacting a symmetrical compound of the formula

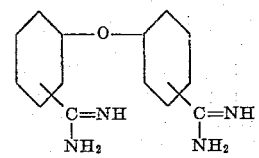

with a member selected from the group consisting of beta-hydroxy-ethane-sulphonic acid, gamma-hydroxy-propane-sulphonic acid, and the ammonium salt of a said acid.

GEORGE NEWBERY.
ALEXANDER PETER TAWSE EASSON.